Patented Aug. 6, 1946

2,405,347

UNITED STATES PATENT OFFICE 2,405,347

CONVERSION OF DI-β-ALKENYL ETHERS TO ALKADIENES AND ALKALI METAL ALKENYLATES

Henry Dreyfus, Frank Bryans, and James Gordon Napier Drewitt, London, England; Claude Bonard administrator of said Henry Dreyfus, deceased No Drawing. Application February 21, 1945, Serial No. 579,156. In Great Britain December 1, 1943

7 Claims. (Cl. 260—681)

This invention relates to transformations of ethers, and is especially concerned with the production of unsaturated hydrocarbons from ethers.

We have found that di-β-alkenyl ethers, i. e. aliphatic ethers containing an olefinic double bond in each of the alkyl radicles in the 2-position with respect to the ether oxygen, are readily converted to aliphatic dienes by treatment with an alkali metal or other strongly electropositive metal, e. g. copper, copper-bronze, zinc or magnesium, or a readily oxidisable derivative thereof, e. g. a metal alkyl or a compound of the type of sodium naphthalene.

Ethers of the above type can conveniently be prepared by reacting a β-unsaturated alcohol with caustic alkali or alkali carbonate and a β-unsaturated alkyl halide, preferably in the absence of added water. The invention specifically includes a process for the production of aliphatic dienes from β-unsaturated alcohols and β-unsaturated alkyl halides by reacting them together in presence of caustic alkali or alkali carbonate, and reacting the unsaturated ether so produced with a strongly electro-positive metal or a readily oxidisable derivative thereof.

Further, we have found that the reduction of ethers in the manner exemplified above can be applied generally to ethers of the formula R—O—R¹ where R and/or R¹ is aliphatically unsaturated or contains a strongly electron-attracting group, e. g. carbonyl or nitrile. In the general case an unsaturated hydrocarbon or substituted hydrocarbon of the formula R—R¹, R—R or R¹—R¹, or a mixture of such products is obtained.

Preferably both radicles R and R¹ are aliphatically unsaturated or contain a strongly electron-attracting group. Examples of such radicles are allyl, crotyl, cinnamyl, cyclo-hexonyl, keto-butyl and 2-nitro-ethyl.

Examples of transformations which can be brought about by the process of the invention are the production of 1:5-hexadiene from diallyl ether, octadiene from dicretyl ether, butadiene from divinyl ether, and dimethyl hexadiene from dimethallyl ether. The reaction appears to take the course illustrated by the following equation:

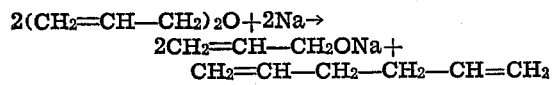

The reaction is remarkable in the ease with which it proceeds, especially when an alkali metal is used as the reducing agent. Thus, diallyl ether on mixing with sodium at room temperature readily reacts, with some evolution of heat, to give hexadiene and sodium allylate. In general, more vigorous conditions are required with less electro-positive metals, e. g. refluxing or heating under pressure with the metal, or passing the ether over the heated metal in the vapour phase.

An inert diluent can be used, and is often convenient, an example of this being the use of powdered sodium in xylene or toluene. Another possibility is to use as diluent an excess of the starting material, or a quantity of the reaction product or of a less reactive ether. The metal alcoholate, e. g. sodium allylate, obtained as a by-product of the reaction can be converted back to the ether, e. g. diallyl ether, by treatment with the appropriate alkyl halide.

As mentioned above, derivatives of strongly electro-positive metals, e. g. a metal alkyl, are also suitable as reducing agents in the process of the invention. Another method of bringing about reduction is to use a solution of an alkali metal in liquid ammonia, when there arises also the possibility of addition of ammonia to the reduced compound. Preferably, however, an alkali metal itself is used and the reaction is carried out at a temperature not greater than 100° C.

The invention is illustrated by the following example, all parts being by weight:

Example 237 parts of allyl alcohol and 250 parts of caustic soda were heated under reflux on a steam-bath for 1¼ hours and 359 parts of allyl chloride added to the mixture during 7 hours, and heating continued on the steam-bath for 10½ hours. The crude diallyl ether was then distilled off up to a base temperature of 140°, dried and separated by fractional distillation into an allyl chloride fraction, intermediate fractions containing allyl chloride, allyl alcohol, diallyl ether and water, and a main diallyl ether fraction, B. 94–5° $n_D^{15}$ 1.420 $D_4^{15}$ 0.804. A further quantity of diallyl ether was isolated by extracting the intermediate fractions with water to remove allyl alcohol, drying the residue and refractionating.

3 parts of sodium were added slowly in small pieces to 15 parts of diallyl ether (obtained as above) at room temperature. The mixture slowly warmed up to about 40° C. After 2 hours the mixture was heated in a bath at 105° C., and maintained at this temperature for 30 minutes, the distillate being collected. This distillate consisted largely of hexadiene in good yield on the sodium used.

Unreacted diallyl ether and allyl alcohol or sodium allylate can be recovered from the distillation residue and re-used.

It is also possible to distil the hexadiene from the mixture as it is formed, if desired under slight vacuum, while feeding sodium and diallyl ether continuously. In such a case it is convenient to feed the sodium in the form of powder suspended in an inert diluent. When such an inert diluent is used it is of advantage to choose one of lower boiling point than the diallyl ether, e. g. n-hexane, so that it can be distilled off continuously along with the hexadiene.

Having described our invention, what we desire to secure by Letters Patent is:

1. Process for the production of an alkadiene comprising reacting a di-β-alkenyl ether with an alkali metal whereby an alkadiene and an alkali metal alkenylate are produced.

2. Process for the production of an aliphatic diene, which comprises reacting a di-β-alkenyl ether in the liquid phase with an alkali metal.

3. Process for the production of an aliphatic diene, which comprises reacting a di-β-alkenyl ether at a temperature below 100° C. with an alkali metal.

4. Process for the production of 1.5-hexadiene comprising reacting diallyl ether with an alkali metal whereby 1.5-hexadiene and an alkali metal allylate are produced.

5. Process for the production of 1.5-hexadiene, which comprises reacting diallyl ether in the liquid phase with an alkali metal.

6. Process for the production of 1.5-hexadiene, which comprises reacting diallyl ether at a temperature below 100° C. with an alkali metal.

7. Process for the production of 1.5-hexadiene, which comprises reacting diallyl ether with sodium at about 25° C.

HENRY DREYFUS.
FRANK BRYANS.
JAMES GORDON NAPIER DREWITT.